(12) United States Patent
Keeley et al.

(10) Patent No.: US 6,374,806 B1
(45) Date of Patent: Apr. 23, 2002

(54) ACTUATING FLUID DELIVERY SYSTEM FOR A FUEL INJECTOR

(75) Inventors: Philip D. Keeley, Hinsdale; Kenneth R. Seymour, II, Villa Park; Martin R. Zielke, Lockport; James H. Yager, St. Charles; John A. Serio, Lake in the Hills, all of IL (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/694,174

(22) Filed: Oct. 23, 2000

Related U.S. Application Data

(63) Continuation-in-part of application No. 09/653,051, filed on Sep. 1, 2000.
(60) Provisional application No. 60/161,330, filed on Oct. 25, 1999.

(51) Int. Cl.$^7$ ................................................ F02M 33/02
(52) U.S. Cl. ...................... 123/456; 123/468; 123/469; 123/470
(58) Field of Search ................................. 123/456, 468, 123/469, 470; 285/144.1, 145.2, 145.3, 145.4, 146.1, 146.2, 272, 282, 298

(56) References Cited

U.S. PATENT DOCUMENTS

| | | |
|---|---|---|
| 4,286,563 A | 9/1981 | Fahim et al. |
| 4,295,452 A | 10/1981 | Lembke et al. |
| 4,621,843 A * | 11/1986 | Straub ........................ 285/356 |
| 4,751,904 A | 6/1988 | Hudson, Jr. |
| 4,776,615 A | 10/1988 | Young |
| 4,996,961 A | 3/1991 | Usui |
| 4,996,962 A | 3/1991 | Usui |
| 5,033,435 A * | 7/1991 | Ostarello et al. ........... 123/469 |
| 5,058,554 A | 10/1991 | Takeda et al. |
| 5,143,039 A | 9/1992 | Gmelin |
| 5,211,149 A | 5/1993 | DeGrace, Jr. |
| 5,273,015 A | 12/1993 | Yonekawa et al. |
| 5,299,542 A | 4/1994 | Hafner |
| 5,372,113 A | 12/1994 | Smith |
| 5,394,850 A * | 3/1995 | Murphy et al. ............. 123/470 |
| 5,423,303 A | 6/1995 | Bennett |
| 5,499,612 A * | 3/1996 | Haughney et al. .......... 123/470 |
| 5,531,202 A | 7/1996 | Lorraine |
| 5,582,437 A * | 12/1996 | Bartholomew ............... 285/272 |
| 5,806,494 A | 9/1998 | Glassey |
| 5,983,864 A * | 11/1999 | Chockley et al. ............ 123/470 |
| 6,237,571 B1 * | 5/2001 | Harrison ..................... 123/469 |

FOREIGN PATENT DOCUMENTS

| | | |
|---|---|---|
| DE | 19606946 A1 | 9/1997 |
| DE | 19734669 A1 | 9/1998 |
| DE | 19735665 A1 | 1/1999 |
| EP | 0829640 A2 | 3/1998 |
| GB | 2021720 A | 12/1979 |

* cited by examiner

Primary Examiner—Thomas N. Moulis
(74) Attorney, Agent, or Firm—Dennis Kelly Sullivan; Jeffrey P. Calfa; Gilberto Hernandez

(57) ABSTRACT

A fluid delivery system for delivering a supply of a fluid from a fluid source to a fuel injector includes a rail for conveying a fluid and being positionable proximate the fuel injector. The rail has a fluid passageway defined therein, the fluid passageway being in fluid communication with the source of fluid. A connector is in fluid communication with both the rail and with the fuel injector for fluidly connecting the rail to the fuel injector. The connector is universally moveable in three axes for accommodating static tolerances existing between the rail and the fuel injector and for accommodating dynamic relative motion between the rail and the fuel injector such that stresses imposed on the fuel injector resulting from being attached to the rail are substantially eliminated.

67 Claims, 4 Drawing Sheets

ACTUATING FLUID DELIVERY SYSTEM FOR A FUEL INJECTOR

RELATED APPLICATIONS

The present application claims the benefit of U.S. Provisional Application Ser. No. 60/161,330, filed Oct. 25, 1999, incorporated herein in its entirety by reference and is a continuation-in-part of U.S. patent application Ser. No. 09/653,051, filed Sep. 1, 2000, incorporated herein in its entirety by reference.

TECHNICAL FIELD

The present invention concerns fluid rail assemblies for fuel injected internal combustion engines. More particularly, the present invention relates to a conveyance of a fluid from a fluid rail assembly to a hydraulically actuated, electronically controlled fuel injector.

BACKGROUND OF THE INVENTION

Certain fuel injectors can be described as hydraulically actuated, electronically controlled. Hydraulic actuation of the fuel injector is preferably effected by engine oil at an elevated pressure. It should be understood that other fluids self contained in the vehicle powered by the internal combustion engine could also be used for hydraulic actuation of the fuel injector, including brake fluid, power steering fluid, or the like.

An exemplary fuel injector of this type is depicted generally in prior art FIG. 1 at 200. A hydraulically-actuated, electronically-controlled, unit injector (HEUI), of the type described in U.S. Pat. No. 5,181,494 and in SAE Technical Paper Series 930270, *HEUI—A New Direction for Diesel Engine Fuel Systems*, S. F. Glassey, at al, Mar. 1–5, 1993, which are incorporated herein by reference, as depicted in prior art FIG. 1. HEUI 200 consists of four main components: (1) control valve 202; (2) intensifier 204; (3) nozzle 206; and (4) injector housing 208.

The purpose of the control valve 202 is to initiate and end the injection process. Control valve 202 is comprised of a poppet valve 210, electric control 212 having an armature and solenoid. High pressure actuating oil is supplied to the valve's lower seat 214 through oil passageway 216. To begin injection, the solenoid of the electric control 212 is energized moving the poppet valve 210 upward the lower seat 214 to the upper seat 218. This action admits high pressure oil to the spring cavity 220 and the passage 222 to the intensifier 204. Injection continues until the electric control 212 solenoid is de-energized and the poppet 210 moves from the upper seat 218 to lower seat 214. Actuating oil and fuel pressure decrease as spent actuating oil is ejected from the injector 200 through the open upper seat oil discharge 224 to the valve cover area of the internal combustion engine, which is at ambient pressure.

The middle segment of the injector 200 consists of the hydraulic intensifier piston 236, the plunger 228, fuel chamber 230, and the plunger return spring 232.

Intensification of the fuel pressure to desired injection pressure levels is accomplished by the ratio of areas between the upper surface 234 of the intensifier piston 236 and the lower surface 238 of the plunger 228, typically about 7:1. The intensification ratio can be tailored to achieve desired injection characteristics. Fuel is admitted to chamber 230 through passageway 240 past check valve 242 from an external fuel supply.

Injection begins as high pressure actuating oil is supplied to the upper surface 234 of the intensifier piston 236 via passageway 222. As the piston 236 and the plunger 228 move downward, the pressure of the fuel in the chamber 230 below the plunger 228 rises. High pressure fuel then flows in passageway 244 past check valve 246 to act upward on needle valve surface 248. The upward force opens needle valve 250 and fuel is discharged from orifice 252 against the bias of return spring 256. The piston 236 continues to move downward until the electric control 212 solenoid is de-energized, causing the poppet valve 210 to return to the lower seat 214 under the force of spring 220, blocking oil flow. The plunger return spring 232 then returns the piston 236 and plunger 228 to their initial upward inactive positions as depicted in FIG. 4. As the plunger 228 returns, the plunger 228 draws replenishing fuel into the fuel chamber 230 across ball check valve 242.

The nozzle 206 is typical of other diesel fuel system nozzles. The valve-closed-orifice style is shown, although a mini-sac version of the tip is also available. Fuel is supplied to the nozzle orifice 252 through internal passages. As fuel pressure increases, the nozzle needle 250 lifts from the lower seat 254 (as described below) allowing injection to occur. As fuel pressure decreases at the end of injection, the spring 256 returns the needle 250 to its closed position seated on the lower seat 254.

The fuel injector 200 uses the hydraulic energy of pressurized actuating fluid, in this case engine oil, to cause injection. The pressure of the incoming oil controls the downward speed of the intensifier piston 236 and plunger 228 movement, and therefore, the rate of fuel injection. The amount of fuel injected is determined by the duration of a signal keeping the electric control 212 solenoid energized. As long as the solenoid is energized and the poppet valve 210 is off its seat, the actuating fluid continues to push down the intensifier piston 236 and plunger 228 until the intensifier piston 236 reaches the bottom of its bore.

A similar hydraulically-actuated unit injector 200 is described in SAE paper No. 1999-01-0196, "Application of Digital Valve Technology to Diesel Fuel Injection" and U.S. Pat. No. 5,720,261. In this injector, the poppet control valve 202 of the HEUI injector has been replaced by a spool type digital control valve which is controlled by two solenoid coils, the valve spool being the armature.

In either case, there is a need for delivery of the high pressure volume of actuating fluid to the fuel injector in order to effect the fuel injection event. Actuating fluid delivery must be accomplished while allowing for assembly and part tolerance stack-ups and relative mechanical motion existing between the apparatus delivering the actuating fluid and the fuel injector. Tolerance stack-ups impose a considerable constraint on the design of any apparatus for delivering actuating fluid to a fuel injector. The injector, cylinder head, actuating fluid rail, and the connecting mechanism between the rail and the injector all have tolerances associated with them. Further, the connection between the rail and the injector must accommodate mechanical and thermal motion between the rail and the injector, the hydraulic load tolerance of the injector and the performance requirements of the injector. A desirable delivery mechanism is one that imposes no stress forces on the injector as a result of the aforementioned tolerances and of the aforementioned relative motion. The delivery mechanism should additionally be easily connectable to the injector.

U.S. Pat. No. 4,996,962, issued Mar. 5, 1991, discloses a fuel delivery rail assembly. The '962 assembly uses sockets affixed to the tops of the fuel injectors. Plastic rail tubes extending between the sockets provide flexible engagements. The '962 patent asserts that with such flexible engagements there is no need of strict limitation about a dimensional accuracy or geometrical orientation of the parts. It should be noted that while it is claimed that the flexible plastic rail tubes solve some of the problems sought to be solved by the present invention, there is no structure or teaching in the '962 patent that relates to the present invention.

SUMMARY OF THE INVENTION

The actuating fluid delivery system of the present invention substantially meets the aforementioned needs of the industry. The connector assembly of the present invention that extends between the rail assembly and the fuel injector accommodates the aforementioned tolerances by being movable in three dimensions. Further, after installation, relative motion existing between the rail assembly and the fuel injector is further accommodated by the ability of the connector assembly to accommodate such motion by being shiftable in three dimensions and is rotatable at is least about a longitudinal axis, such rotation setting up the condition under which shifting in a plane disposed orthogonally with respect to the longitudinal axis may occur. The shifting does not occur unless there is the rotation and once rotation occurs, there is shifting. Additionally, the present invention provides for an exceedingly short path for the actuating fluid to travel from the rail assembly to the fuel injector. In the present invention, it is desirable that the $L/D^2$ ratio for the connector assembly be less than one. The present invention is less than 70 mm in length and satisfies the aforementioned $L/D^2$ ratio. Further, the connector assembly of the actuating fluid delivery system of the present invention is disposable in the limited space defined between the rocker arms of the head of the internal combustion engine.

The present invention is a fluid delivery system for delivering a supply of a fluid from a fluid source to a fuel injector and includes a rail for conveying a fluid, the rail being positionable proximate the fuel injector. The rail has a fluid passageway defined therein, the fluid passageway being in fluid communication with the source of fluid. A connector is in fluid communication with both the rail and with the fuel injector for fluidly connecting the rail to the fuel injector. The connector is moveable in three axes for accommodating static tolerances existing between the rail and the fuel injector and for accommodating dynamic relative motion between the rail and the fuel injector such that stresses imposed on the fuel injector resulting from being fluidly connected to the rail are substantially eliminated.

DETAILED DESCRIPTION OF THE EMBODIMENT

Figure 1:
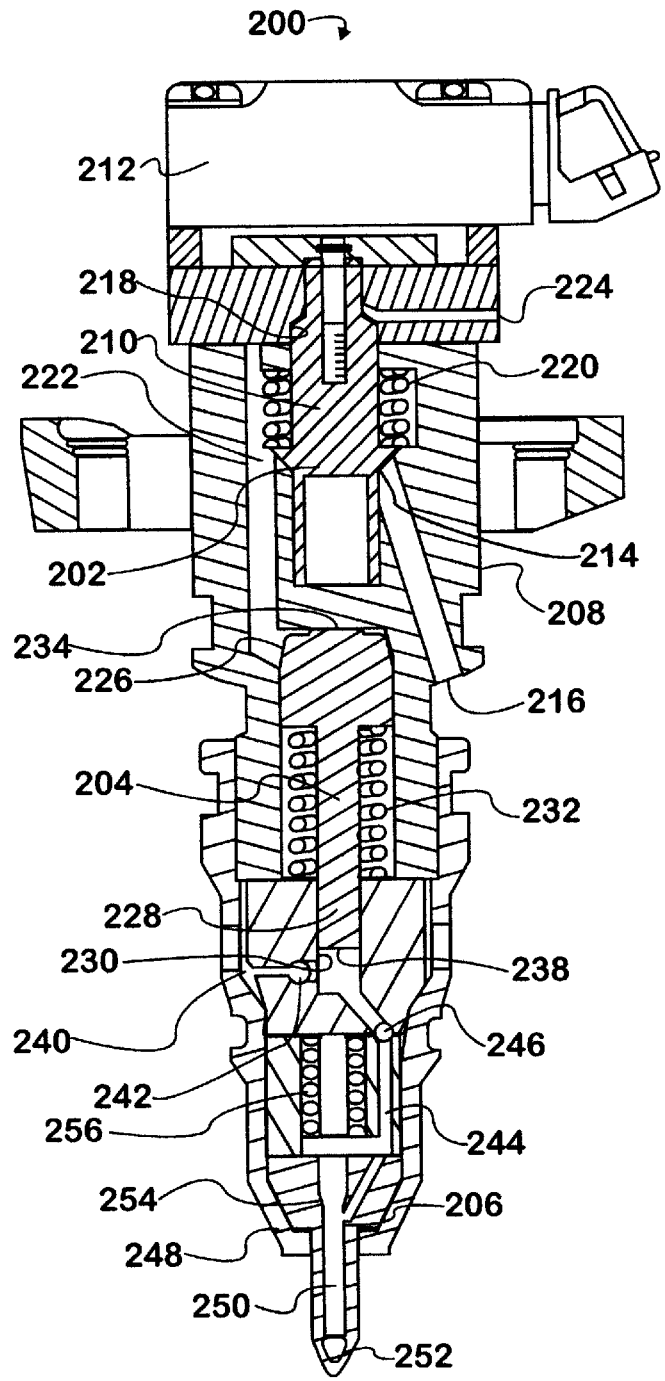
FIG. 1 is a sectional view of an exemplary prior art fuel injector.
Figure 2:
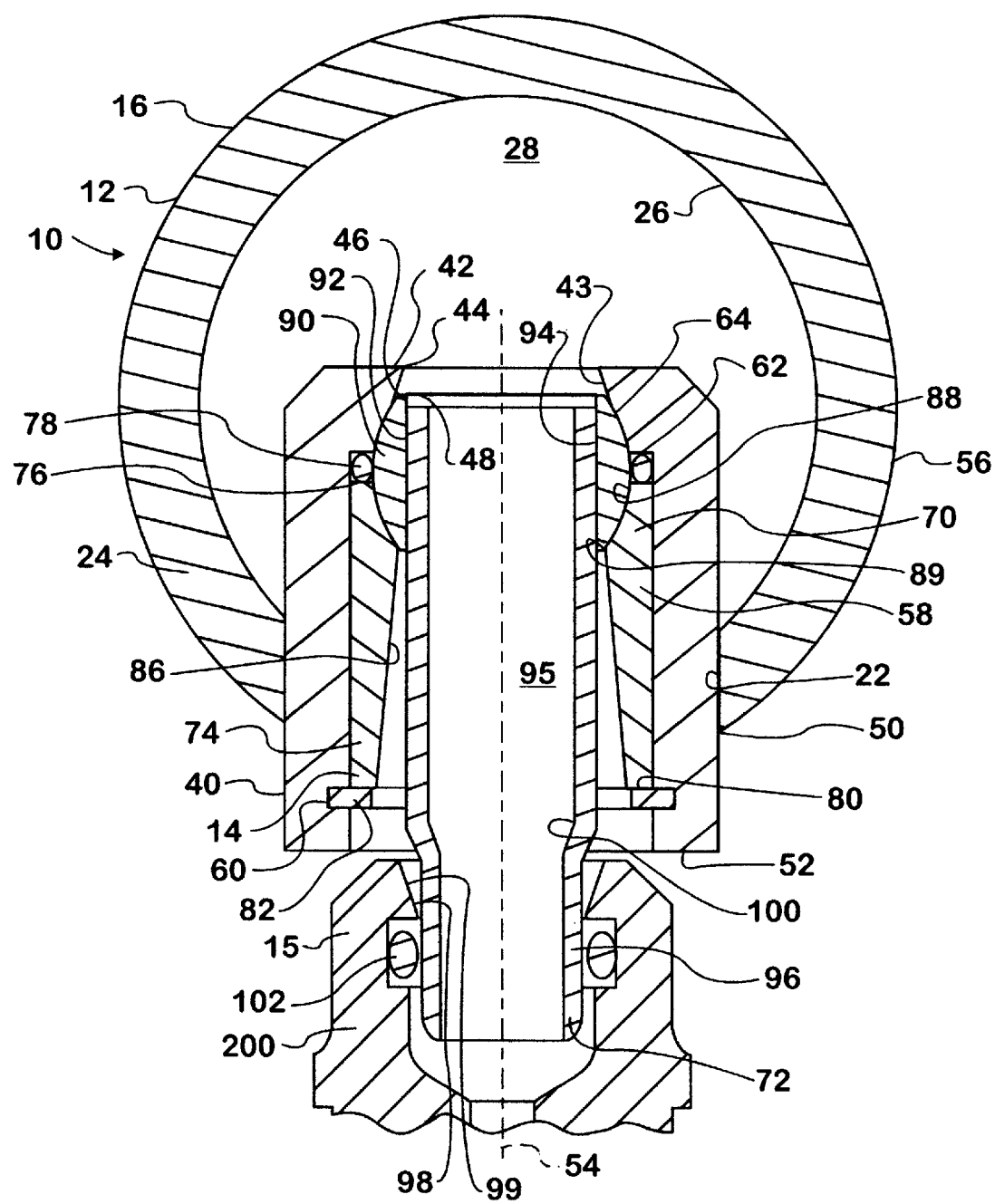
FIG. 2 is a sectional view of the connection assembly of the actuating fluid delivery system of the present invention, the section being taken orthogonal to the longitudinal axis of the rail assembly.

The actuating fluid delivery system of the present invention is shown generally at 10 in FIG. 2. In FIG. 2, the actuating fluid delivery system 10 is depicted coupled to a fuel injector 200 of the types described above with reference to the prior art. It is understood that the fuel injector 200 is exemplary only and other hydraulically-actuated fuel injectors may be utilized with the actuating fluid delivery system 10.

The actuating fluid delivery system 10 has two major components: rail assembly 12 and connector sleeve assembly 14. Delivery system 10 may be directly coupled to the injector 200 or may be indirectly coupled to the injector 200 by means of a receiver assembly 15, as depicted in FIGS. 2 that mounts on the injector 200 and is fluidly coupled thereto.

Figure 5:
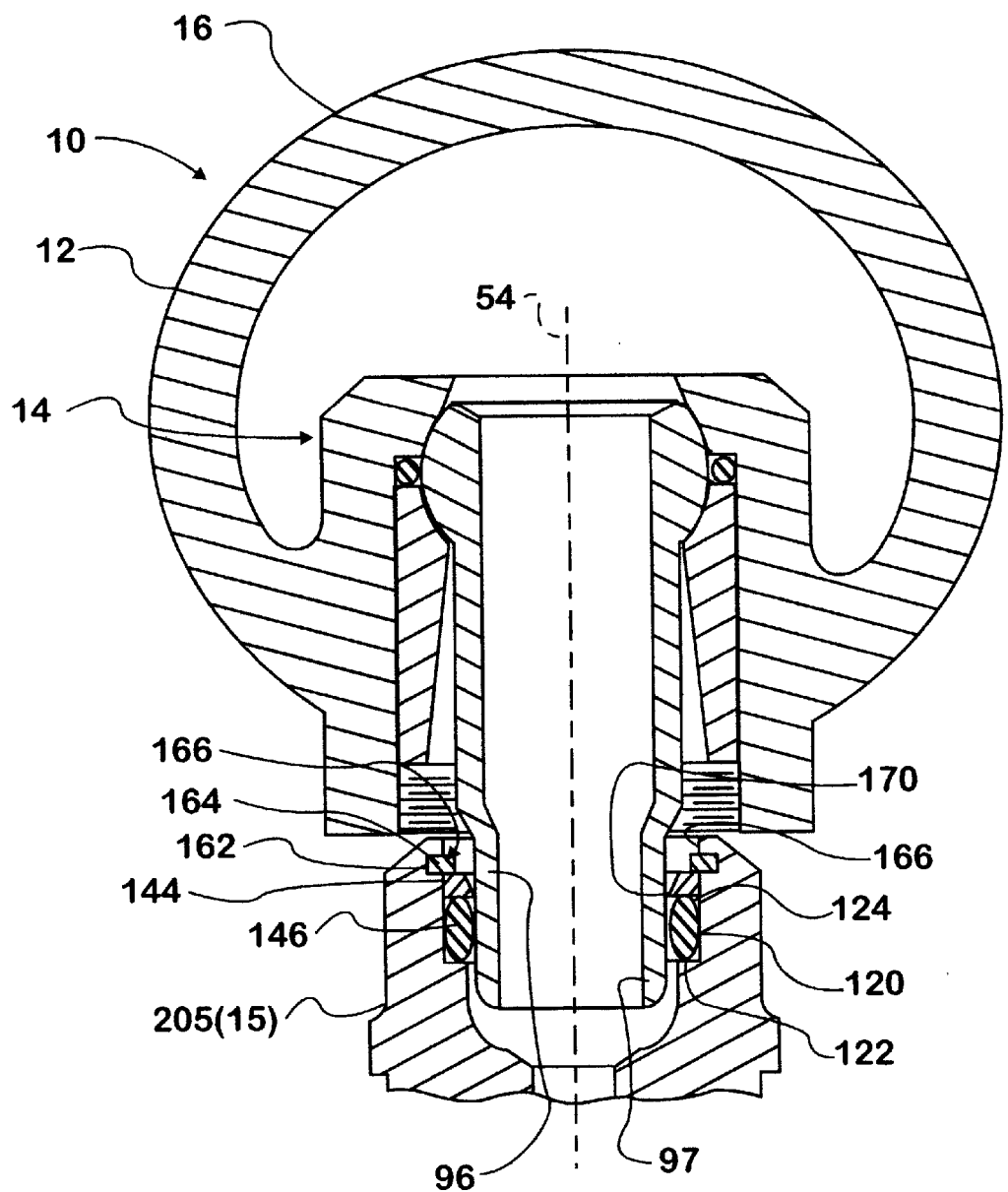
FIG. 5 is a sectional view of a further alternative embodiment of the present invention.

The rail assembly 12 has two subcomponents: elongate rail 16 and sleeve 18. Preferably, the rail and sleeve 18 are a one piece nodular iron casting as shown in FIG. 5 but may be a welded or brazed assembly as shown in FIG. 2.

The elongate rail 16 is preferably positioned immediately above and spaced apart from a row of fuel injectors disposed in an engine cylinder head. For an in-line engine, a single rail 16 preferably is positioned above the row of fuel injectors 200 with a connector sleeve assembly 14 connecting the elongate rail 16 to each of the fuel injectors but may be disposed to one side of the injectors to conserve space under the valve cover. For a V-configuration engine, a pair of rails 16 respectively service each of the two banks of cylinders. Each of the elongate rails 16 is fluidly coupled to a source of high pressure actuating fluid which is preferably engine lubricating oil. Fluid pressures in the rail 16 may be on the order of 3500 psi.

A relatively large bore 22 is defined in the elongate rail 16 proximate each of the fuel injectors 200 to be serviced. The bore 22 extends through the rail wall 24 of the rail 16 and is preferably disposed facing the injector 200 when the rail 16 is operationally positioned with respect to the injector 200. The bore 22 is defined along an axis that is preferably transverse to the longitudinal axis of the elongate rail 16. The bore 22 intersects and is in fluid communication with the fluid passageway 25 defined in the rail 16. In FIG. 2, the rail 16 is depicted in cross section, the section being taken transverse to the longitudinal axis of the rail 16. The elongate rail 16 may be fixedly coupled to the cylinder head of the engine or a rail carrier attached to the cylinder head, as by bolts or studs, to counteract the hydraulic forces tending to separate the rail from the injectors. The rail wall 24 has an inner surface 26 that defines the fluid passage 28 in the rail 16.

The sleeve 18 of the connector sleeve assembly 14 of the actuating fluid delivery system 10 is comprised of a sleeve cylinder body 40. The sleeve cylinder body 40 is closely received within the bore 22 of the rail assembly 12. Sleeve cylinder body 40 has an upper margin 42. The upper margin 42 projects into the fluid passage 28 and includes a bore 43 in fluid communication with the fluid passage 28. The outer margin 44 of the bore 43 has a lesser diameter than the inner margin 46 of the bore 43, the wall 48 of the bore 43 being tapered, decreasing in diameter between the outer margin 44 and the inner margin 46. The exterior intersection 50 of the sleeve cylinder body 40 with the bore 22 is preferably welded or brazed to define a fluid tight joint between the sleeve cylinder body 40 and the bore 22 of the elongate rail 16.

The sleeve cylinder body 40 has an opposed lower margin 52 that is preferably spaced apart from the injector 200 in order to accommodate relative motion between the rail 16 and the injector 200 along the longitudinal axis 54. The lower margin 52 is preferably disposed beyond the point of tangency (not shown) with the exterior surface of the elongate rail 16, projecting from the rail 16, projecting from the rail 16.

The sleeve cylinder body 40 has a bore 58 defined therethrough. The portion of the bore 58 extending from the lower margin 52 upward, as depicted in FIG. 2, is cylindrical. The cylindrical portion of the bore 58 presents a ring groove 60 proximate the lower margin 52. The bore 58 has a shoulder 62 proximate the upper margin 42 of the cylinder body 40. The shoulder 62 is joined to the wall 48 of the bore 43 by a generally curved section 64 of the bore 58.

The connector assembly 14 of the actuating fluid delivery system 10 includes two major subcomponents: a retaining collar or ferrule 70 and a central tube 72.

The ferrule 70 of the connector assembly 14 includes a ferrule body 74. The ferrule body 74 has an upper margin 76 that is spaced slightly apart from the shoulder 62 when the ferrule 70 is disposed in the sleeve 40 to define an annular groove therebetween. An O-ring seal 78 may be disposed within the annular groove defined between the upper margin 76 and the shoulder 62 to define a fluid tight seal between the ferrule 70 and the sleeve assembly 14.

The ferrule body 74 presents a generally flat bottom face 80. The ferrule 70 may be held within the cylindrical portion of the bore 58 of the sleeve 14 by a retainer ring 82 bearing on the face 80 and disposed in the ring groove 60. Preferably, the ferrule body has threads in its exterior surface and the bore 58 is threaded of the sleeve 14 is threaded to permit the ferrule body 74 to be threaded into the sleeve 14 as shown in FIG. 5. In either disposition, the ferrule 70 may be in compressive engagement with the o-ring seal 78.

A bore 84 is defined longitudinally through the ferrule 70. The bore 84 has a somewhat greater section at the face 80 than proximate the innermost margin 81 of the straight wall of the bore 84. The wall 86 of the bore 84 is therefor generally conical in shape, tapering inwardly from the face 80 upward to the innermost margin 81. The wall 86 is joined to the upper margin 76 by curved wall section 88. The curved wall section 88 extends from the innermost margin 81 to the upper margin 76. The radius of the curved wall section 88 is generally the same as the radius of the curved section 64 of the bore 58. The curved wall sections 64, 88 cooperate to define an annulus between the central tube 72, the ferrule 70 and the sleeve 14. The annulus defines a ball socket.

A ball 90 of a ball joint 92 is disposed in the ball socket 89. The ball 90 has a bore 94 defined therethrough for accommodating a welded or brazed securement to the tube 72. Preferably, the ball 90 may be formed integral (unitary) with the tube 72 as shown in FIG. 5. In either case, the ball 90 and the tube 72 have no slideable engagement therebetween.

The central tube 72 of the connector assembly 14 includes a tube body 96 having a bore 95 defined therein, the bore 95 fluidly connecting the axial fluid passage 28 to the injector 200. The tube body 96 has a reduced diameter portion 97 proximate the injector 200 in order to be receivable within a locating bore 98 defined in the receiver 15. The bore 98 preferably has a chamfered face 99 having a substantially greater diameter at the entry of the bore 98 than the exterior diameter of the tube 72. The chamfered face accommodates lateral relative motion in two dimensions between the tube 72 and the injector 200. Immediately below the chamfered face 99, the bore 98 is provided with a sealing groove 100, so that the upper edge 102 of the groove 100 and the chamfer face 99 define a very short length of the bore 98 disposed adjacent the tube 72, as shown, referred to herein as a knife edge although not necessarily sharp enough to cut. The knife edge is provided to minimize the length of the close clearance to accommodate reasonable amounts of angular misalignment of the connector tube 96 relative to the injector inlet bore. The tube 72 is disposed in a fluid-tight, but slidable engagement in the receiver 15 of the injector 200 by an O-ring seal 106 which is supported against extruding movement against the top of the groove 100 by a backup ring 104. Below the groove 100, the injector assembly has a larger bore 108 to accommodate larger movement of the end of the central tube 72 as it pivots about the locating bore 98.

In assembly, the ball 90 and the tube 72 are placed into the ball socket 89. The retaining ferrule 70 is then threaded into or slid into the bore 58 defined in the sleeve 40. The ring seal 78 is then in a fluid-tight engagement with the ball 90. The ring 82 is then snapped in place to fixedly compressively engage the ferrule 70 in the sleeve 14. The conical bore 86 in cooperation with the chamfered face 99 of the bore 98 accommodates relative motion in the X, Y axes (the X, Y axes being disposed orthogonal both to themselves and in a plane orthogonal to the longitudinal axis 54) between the fluid delivery system 10 and the injector 200. The slideable engagement of the tube 72 and the O-ring seal 106 accommodates motion of the fluid delivery system 10 relative to the injector 200 in the Z direction, coincident with the longitudinal axis 54.

In the static relationship of the actuating fluid delivery system 10 to the injector 200, no stress is imposed on the injector 200 as a result of the aforementioned slidability in the Z dimension 54. Additionally, the ability of the tube 72 to shift in the X, Y plane relative to the injector 200 provides for three dimensional shiftability. Such shifting in the X, Y plane is effectively a ball and socket type shifting resulting from the rotational motion of the ball 90 within the socket 89 and is accommodated in the injector 200 by the shifting of the reduced diameter portion 97 of the central tube 72 about the effective pivot point formed by the bore 98 and seal ring 106.

Subsequent dynamic motion of the actuating fluid delivery system 10 with respect to the fuel injector 200 maybe caused, for example, by the vibration of engine operation and by expansion and contraction of the various components due to heating and cooling and the like. The dynamic motion is similarly accounted for in the X, Y and Z axes as previously described with reference to the static tolerance stack-up. Further, the tube 72 is rotatable with respect to the fuel injector 200 at least about a longitudinal axis 54, such rotation setting up the condition under which shifting in the X-Y plane disposed orthogonally with respect to the longitudinal axis 54 may occur. The shifting does not occur unless there is the aforementioned rotation and once this rotation occurs, there is the above described shifting. Relative motion of the actuating fluid delivery system 10 with respect to the injector 200 is accommodated by freedom of certain actuating fluid delivery system 10 components to move enough in the X, Y, and Z axes to accommodate substantially all of the dynamic motion that occurs between the delivery system 10 and the fuel injector 200 during operation of the engine. Accordingly, in both a static situation and a dynamic situation, virtually no mechanical stresses are imposed on the fuel injector 200 by the delivery system 10 as a result of the ability of the connector assembly 14 to rotate about at least one axis and to move three dimensionally in the X, Y and Z axes.

During fuel injection, for delivery of an actuating fluid to the fuel injector 200, high pressure fluid flows from the source of high pressure fluid through the elongate rail 16. Fluid passes through the axial bore 100 of the tube body 72 to the fuel injector 200 for controlling the injection event as described above for the prior art.

Figure 3:
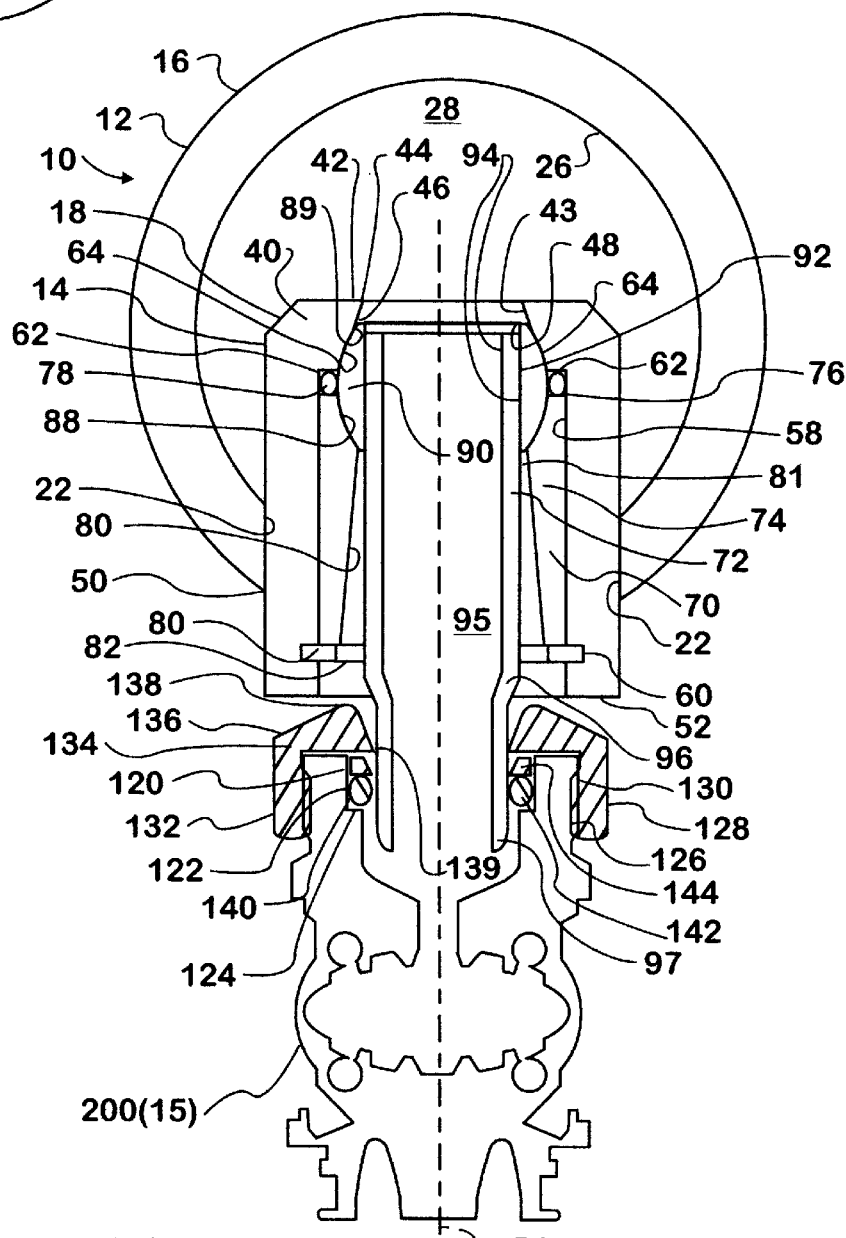
FIG. 3 is a sectional view of an alternative embodiment of the present invention.

A further preferred embodiment of the present invention is depicted in FIG. 3. A principle difference between the embodiment of FIG. 3 and the embodiment of FIG. 2 is the means of coupling the reduced diameter portion 97 of the tube body 96 to the injector 200. In this embodiment, an annular shelf 120 is defined in the inner margin of the injector 200 or the receiver 15, as the case may be. In the depiction of FIG. 3, the annular shelf 120 is a horizontal side 122 joined to a vertical side 124. The annular shelf 120 defines an annular space between the outer margin of the reduced diameter portion 97 of the tube body 96 and the injector 200 or receiving 15. A plurality of is threads 126 are defined on the outer margin of the injector 200 substantially opposed to the annular shelf 120.

A capped nut 128 is threadedly engaged with the threads 126. The capped nut 128 has threads 130 defined on the inner margin of the sidewall 132 of the capped nut 128 in order to accomplish the threaded engagement. The sidewall 132 is generally and has an inward extending cap 134 formed at the upper margin of the sidewall 132.

The cap 134 has a peaked roof 136 with a chamfered or conical surface 138. The chamfered surface 138 defines a bore 139 at the lower margin of the chamfered surface 138. The bore 139 is designed to make a close sliding engagement with the exterior margin of the reduced diameter portion 97 of the tube body 96. The underside surface of the cap 134 defines a lower face 140.

The compression face 140 substantially encloses the annular space defined by the annular shelf 120. In the depiction of FIG. 3, an O-ring seal and a backup ring 144 are disposed in this annular space. As the cap nut 128 is threaded down onto the injector 200, the lower face 140 bears on the backup ring 144 which forms the upper limiting surface for the O-ring seal 142 which seals radially between the tube body 96 and the vertical wall 124. This engagement still provides for relative translational motion between the tube body 96 and the injector 200 along the longitudinal Z axis 54. Additionally, the chamfered face 138 accommodates lateral relative motion existing between the rail assembly 12 and the fuel injector 200 in the X-Y plane disposed orthogonal to the longitudinal axis 54.

Figure 4:
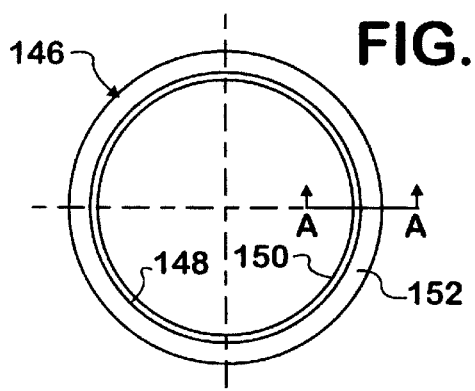
FIG. 4 is an elevational view of a sealing ring of the present invention.
Figure 4A:
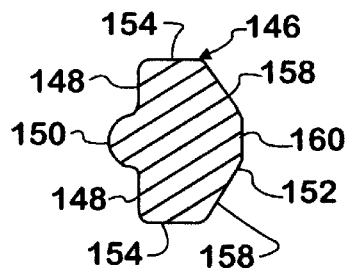
FIG. 4a is a sectional view of the sealing ring taken along the section A—A of FIG. 4.

It is understood that the O-ring seal 142 and backup ring 144 are exemplary only. Other sealing means can be used including a glass filled ring. Additionally, a D-ring seal as depicted in FIGS. 4 and 4a may be substituted for the O-ring seal 142 and backup ring 144 shown in FIG. 2. The D-ring seal 146 is preferably made a fluorocarbon material and has a relatively high durameter characteristic. The durameter characteristic may be greater than 90 and is more preferably 96. The D-ring seal 146 has a generally flat face 148 with a centrally disposed protrusion 150 which contacts the vertical wall 124. A curved face 152 extends from the upper and lower margin of the flat face 148 and may be defined by a series of facets. In the depiction of FIG. 4a, the curved face 152 has a pair of horizontal facets 154, a pair of inclined facets 158, and a single vertical facet 160 to define the generally curved shape of the curved face 152. In the embodiment of FIG. 3, the D-ring seal 146 may replace both the O-ring seal 142 and the backup ring 144 for a cost savings.

FIG. 5 depicts a preferred embodiment of the actuating fluid delivery system 10 and substitutes a snap ring type retainer for the cap nut 128 of FIG. 3. To effect this substitution, a ring retainer groove 162 is defined at the upper margin of the annular shelf 120. A chamfered face 166 is defined in the injector 200 extending upward from the ring retainer groove 162. It should be noted that the threads 130 defined in the outer margin of the injector 200 as depicted in FIG. 3, are eliminated in the depiction of FIG. 5. A snap ring 164 may be disposed in the ring retainer groove 162. A backup ring 144 is disposed in the annular space defined by the annular shelf 120 immediately beneath the snap ring 164. The backup ring 144 retains the D-ring seal 146 within this annular space. It should be noted that the backup ring 144 has a tapered inner face 168 that tapers to a knife edge 170 at the lower margin of the tapered face 168. The knife edge 170 defines a bore within the backup ring 144 which is only slightly greater than the outside diameter of the reduced diameter portion 97 of the tube body 96 to provide a close clearance to keep the seal ring 146 from extruding out along the tube body 96. The knife edge is provided to minimize the length of the close clearance to accommodate reasonable amounts of angular misalignment of the connector tube 96 relative to the injector inlet bore.

In assembly, the D-ring seal 146 and the backup ring 144 are disposed within the annular space defined by the annular shelf 120. The snap ring 164 is compressed inward as it rides down the chamfered face 166 and then expands outward to fill the ring retainer groove 162 to hold the backup ring 144 and the D-ring seal 146 in position to prevent the seal from blowing out. The D-ring forms a fluid-tight radial seal between the fuel injector 200 and the actuating fluid delivery system 10. It should be noted that the tapered face 168 on the backup ring 144 accommodates relative motion of the actuating fluid delivery system 10 relative to the fuel injector 200 and the X-Y plane while the sliding engagement of the exterior surface of a reduced diameter portion 97 of the tube body 96 and the D-ring seal 146 accommodate relative motion between the actuating fluid delivery system 10 and the injector 200 along the longitudinal Z axis 54.

The present invention may be embodied in other specific forms without departing from the spirit of the essential attributes of the invention. Therefore, the illustrated embodiments should be considered in all respects as illustrative and not restrictive, reference being made to the appended claims rather than to the foregoing description to indicate the scope of the invention.

What is claimed is:

1. A fluid delivery system for servicing a plurality of fuel injectors by delivering a supply of a fluid from a fluid source to each fuel injector of the plurality of fuel injectors, comprising:

rail means for conveying fluid, the rail means being positionable proximate the plurality of fuel injectors and having a fluid passageway defined therein, the fluid passageway being in fluid communication with the source of fluid; and connector means in fluid communication with both the rail means and with a fuel injector of the plurality of fuel injectors for fluidly connecting the rail means to the fuel injector, the connector means being moveable in three planes to accommodate static tolerances existing between the rail means and the fuel injector and having a single ball and socket for being moveable in three orthogonal axes to accommodate dynamic relative motion between the rail means and the fuel injector.

2. The fluid delivery system of claim 1 wherein the connecting means is translatable in a first axis with respect to the rail means and is shiftable in plane that is defined by a second and a third axis, the second and third axes being in an orthogonal relationship to each other and to the first axis.

3. The fluid delivery system of claim 1 wherein the first axis is substantially coincident with a connector means longitudinal axis.

4. The fluid delivery system of claim 1 wherein the connecting means ball and a socket forms a coupling, the ball being rotatably shiftable in the socket, the shifting of the ball providing for motion in the plane that is disposed in an orthogonal relationship to a connector means longitudinal axis.

5. The fluid delivery system of claim 1 wherein the connecting means includes a collar, the collar being disposable in a rail means component, a socket being defined by the collar in cooperation with the rail means component.

6. The fluid delivery system of claim 5 wherein the connecting means includes a fluid conveying tube, the tube being rotatably coupled to the collar and having a tube fluid passageway defined therein, the tube fluid passageway being fluidly communicable with the fuel injector and with a fluid passageway defined in the rail means.

7. The fluid delivery system of claim 6 wherein the connecting means tube includes a ball, the ball being sealably, rotatably disposed in the cooperatively defined socket.

8. The fluid delivery system of claim 7 wherein the connecting means includes a seal disposed at an intersection of the rail means component, the collar and the tube ball for forming a fluid tight seal therebetween.

9. The fluid delivery system of claim 5 wherein the connecting means collar has a conical inner margin, the conical inner margin accommodating relative motion of the connecting means relative to the fuel injector, the relative motion occurring in a plane disposed orthogonal to a connecting means longitudinal axis.

10. The fluid delivery system of claim 1 wherein the connecting means tube includes a gland type coupler for effecting a substantially fluid-tight, slideable coupling with the fuel injector.

11. The fluid delivery system of claim 10 wherein the gland type coupler includes a capped nut, the capped nut having a bore defined therein for receiving a connector means tube therein, the capped nut engaging sealing means for retaining the sealing means in the bore.

12. The fluid delivery system of claim 1 wherein the gland type coupler includes at least an O-ring seal.

13. The fluid delivery system of claim 12 wherein the sealing means further comprises a backup ring, the backup ring retaining the O-ring seal in an aperture formed annular to the connector means tube.

14. The fluid delivery system of claim 13 wherein the sealing means backup ring has an inside diameter defined by an inclined face terminating at a knife edge, the knife edge being engageable with the 13 connector means tube, the inclined face accommodating relative shifting of the connector means tube relative to the fuel injector in a plane disposed orthogonal to a connector means tube longitudinal axis, the knife edge being slideable relative to the connector means tube for accommodating translation of the connector means tube relative to the fuel injector along the connector means tube longitudinal axis.

15. The fluid delivery system of claim 12 wherein the O-ring seal has a substantially D-shaped cross section.

16. A connector for fluidly coupling a fluid conveying rail to a fuel injector, the connector being rotatable about a longitudinal axis and translatable in the first longitudinal axis with respect to the rail and having a single ball and socket being shiftable in a plane that is disposed in an orthogonal relationship to the first longitudinal axis when the connector is coupled to the rail and to the fuel injector.

17. The connector of claim 16 wherein the connector ball and a socket forms a first coupling, the ball being shiftable in the socket.

18. The connector of claim 17 including a collar, the collar being disposable in a rail component, the socket being defined by the collar in cooperation with the rail component.

19. The connector of claim 18 including a fluid conveying tube, the tube being rotatably coupled to the collar and having a tube fluid passageway defined therein, the tube fluid passageway being fluidly communicable with the fuel injector and with a fluid passageway defined in the rail.

20. The connector of claim 19 wherein the tube includes the ball, the ball being sealably, rotatably disposed in the cooperatively defined socket.

21. The connector of claim 20 including a seal compressively disposed at an intersection of the rail component, the collar and the tube ball for forming a fluid tight seal therebetween.

22. The connector of claim 21 wherein the collar has a conical inner margin, the conical inner margin accommodating relative motion of the connector relative to the fuel injector, the relative motion occurring in a plane disposed orthogonal to the connector longitudinal axis.

23. The connector of claim 16 including a gland type coupler for effecting a substantially fluid-tight, slideable coupling with the fuel injector.

24. The connector of claim 23 wherein the gland type coupler includes a capped nut, the capped nut having a bore defined therein for receiving a connector means tube therein, the capped nut engaging a sealing component retaining said component in position to effect the substantially fluid-tight, slideable coupling.

25. The connector of claim 24 wherein the sealing component includes at least an O-ring seal.

26. The connector of claim 25 wherein the sealing component further comprises a backup ring, the backup ring engaging the O-ring seal in an aperture formed annular to the connector tube.

27. The connector of claim 26 wherein the sealing means backup ring has an inside diameter defined by an inclined face terminating at a knife edge, the knife edge being engageable with the connector tube, the inclined face accommodating relative shifting of the connector tube relative to the fuel injector in a plane disposed orthogonal to a connector tube longitudinal axis, the knife edge being slideable relative to the connector tube for accommodating translation of the connector tube relative to the fuel injector along the connector tube longitudinal axis.

28. The connector of claim 25 wherein the O-ring seal has a substantially D-shaped cross section.

29. A fluid delivery system for servicing a plurality of fuel injectors by delivering a supply of a fluid from a fluid source to the plurality of fuel injectors, comprising:

a rail assembly for conveying a fluid, the rail assembly being positionable proximate the plurality of fuel injectors and including a rail having a fluid passageway defined therein, the fluid passageway being in fluid communication with the source of fluid; and a connector assembly being in fluid communication with both the rail assembly and with a certain fuel injector of the plurality of fuel injectors for fluidly connecting the rail assembly to the fuel injector, the connector assembly being moveable in three orthogonally disposed axes for accommodating static tolerances existing between the rail assembly and the fuel injector and having a single ball and socket for accommodating dynamic relative motion between the rail assembly and the fuel injector.

30. The fluid delivery system of claim 29 wherein the rail assembly has an elongate rail and an integral intersecting sleeve associated with each fuel injector to be serviced, the fluid passageway being defined in the rail.

31. The fluid delivery system of claim 30 wherein each rail assembly sleeve has an axial bore defined therein, the axial bore being in fluid communication with the rail fluid passageway.

32. The fluid delivery system of claim 31 wherein each rail assembly sleeve is disposed in fluidly sealing engagement with at least one bore defined in the rail.

33. The fluid delivery system of claim 26 wherein the connector assembly is translatable in a first longitudinal axis with respect to the rail and is shiftable in plane that is defined by a second and a third axis, the second and third axes being in an orthogonal relationship to each other and to the first axis.

34. The fluid delivery system of claim 26 wherein the connection assembly ball and socket forms a coupling, the ball being rotatably shiftable in the socket, the shifting of the ball providing for motion in the plane that is disposed in an orthogonal relationship to a connector means longitudinal axis.

35. The fluid delivery system of claim 26 wherein the connector assembly includes a collar, the collar being disposable in a rail component, a socket being defined by the collar in cooperation with the rail component.

36. The fluid delivery system of claim 35 wherein the connector assembly includes a fluid conveying tube, the tube being rotatably coupled to the collar and having a tube fluid passageway defined therein, the tube fluid passageway being fluidly communicable with the fuel injector and with a fluid passageway defined in the rail.

37. The fluid delivery system of claim 36 wherein the connector assembly tube includes a ball, the ball being sealably, rotatably disposed in the cooperatively defined socket.

38. The fluid delivery system of claim 37 wherein the connector assembly includes a seal disposed at an intersection of the rail means component, the collar and the tube ball for forming a fluid tight seal therebetween.

39. The fluid delivery system of claim 35 wherein the connector assembly collar has a conical inner margin, the conical inner margin accommodating relative motion of the connecting means relative to the fuel injector, the relative motion occurring in a plane disposed orthogonal to the connector assembly longitudinal axis.

40. The fluid delivery system of claim 26 wherein the connector assembly tube includes a gland type coupler for effecting a substantially fluid-tight, slideable coupling with the fuel injector.

41. The fluid delivery system of claim 40 wherein the gland type coupler includes a capped nut, the capped nut having a bore defined therein for receiving a connector tube therein, the capped nut engaging a sealing assembly for retaining the sealing assembly to effect the substantially fluid-tight, slideable coupling.

42. The fluid delivery system of claim 41 wherein the sealing assembly includes at least an O-ring seal.

43. The fluid delivery system of claim 42 wherein the sealing assembly further includes a backup ring, the backup ring engaging the O-ring seal in an aperture formed annular to the connector means tube.

44. The fluid delivery system of claim 43 wherein the sealing assembly backup ring has an inside diameter defined by an inclined face terminating at a knife edge, the knife being engageable with the connector assembly tube, the inclined face accommodating relative shifting of the connector assembly tube relative to the fuel injector in a plane disposed orthogonal to a connector assembly tube longitudinal axis, the knife edge being slideable relative to the connector assembly tube for accommodating translation of the connector means tube relative to the fuel injector along the connector assembly tube longitudinal axis.

45. The fluid delivery system of claim 42 wherein the O-ring seal has a substantially D-shaped cross section.

46. A fluid delivery system for servicing a plurality of fuel injectors by delivering a supply of a fluid from a fluid source to the plurality of fuel injectors, comprising:

a rail assembly for conveying a fluid, the rail assembly being positionable proximate the plurality of fuel injectors and including a rail having a fluid passageway defined therein, the fluid passageway being in fluid communication with the source of fluid; and a connector assembly being in fluid communication with both the rail assembly and with a certain fuel injector of the plurality of fuel injectors for fluidly connecting the rail assembly to the fuel injector, the connector assembly being moveable relative to the fuel injector for accommodating static tolerances existing between the rail assembly and the fuel injector and having a single ball and socket for accommodating dynamic relative motion between the rail assembly and the fuel injector.

47. The fluid delivery system of claim 46 wherein the connector assembly tube includes a gland type coupler for effecting a substantially fluid-tight, slideable coupling with the fuel injector.

48. The fluid delivery system of claim 47 wherein the gland type coupler includes a retainer engaging a sealing assembly for retaining the sealing assembly within an annular space radially adjacent said connector assembly.

49. The fluid delivery system of claim 48 wherein the sealing assembly includes at least a ring seal.

50. The fluid delivery system of claim 49 wherein the sealing assembly further includes a backup ring, the backup ring engaging the ring seal in an aperture formed annular to the connector assembly.

51. The fluid delivery system of claim 50 wherein the sealing assembly backup ring has an inside diameter defined by an inclined face terminating at a knife edge being engageable with the connector assembly, the knife edge being slideable relative to the connector assembly tube for accommodating translation of the connector means tube relative to the fuel injector along the connector assembly tube longitudinal axis.

52. The fluid delivery system of claim 49 wherein the O-ring seal has a substantially D-shaped cross section.

53. A coupler for fluidly coupling a rail assembly including a fluid conveying connector to a fuel injector, the fuel injector having a fluid passageway defined therein, the injector fluid passageway being fluidly communicable with a rail fluid passageway by an interconnecting generally tubular rail component, the coupler comprising:

a seal being annularly disposed with respect to the fluid conveying connector component and being disposable in an inner circumferential surface of a receiver component, the receiver component being operably coupled to the fuel injector; and a capped nut being annularly disposed with respect to the fluid conveying connector component, the capped nut having a seal engaging surface and having a first set of threads engageable with a second set of threads defined on the receiver component, whereby threadedly engaging the first and second set of threads acts to force the seal engaging surface into engagement with the seal in an annular space defined between the fluid conveying connector component and the inner circumferential surface of the receiver to form a substantially fluid-tight seal between the fluid conveying connector component and the fuel injector.

54. The coupler of claim 53 further including a receiver assembly fixedly, fluidly coupled to the fuel injector, the inner circumferential surface being defined in the receiver assembly and the second set of threads being formed on a receiver flange surface.

55. The coupler of claim 53 wherein the seal has a substantially D-shaped cross section.

56. The coupler of claim 55 wherein the substantially D-shaped cross section of the seal includes a flat face having a protrusion defined thereon and a curved face defined by a plurality of facets.

57. The coupler of claim 53 wherein the capped nut has a peaked roof, a chamfered surface declining to a knife edge to define a receiving bore, the receiving bore receiving the tubular rail component therein.

58. The coupler of claim 57 wherein the capped nut chamfered surface accommodates relative rotational motion and shifting motion between the tubular rail component and the fuel injector.

59. The coupler of claim 57 wherein the receiving bore receives the tubular rail component therein in a sliding engagement, the sliding engagement accommodating relative rotational motion and longitudinal translational motion between the tubular rail component and the fuel injector.

60. The coupler of claim 53 wherein the seal includes an O-ring seal in engagement with a backup ring.

61. A method of conveying an actuating fluid from a fluid source to a plurality of fuel injectors having the steps of:

fluidly coupling an elongated rail having a fluid passage defined therein to the actuating fluid source;

fluidly coupling the rail to each of the plurality of fuel injectors by means of a connector that is in fluid communication with the rail and with a certain fuel injector of the plurality of fuel injectors; and minimizing the static and dynamic stresses on the fuel injector by providing for translatability of the connector in a first longitudinal axis shiftability of the connector by means of a ball and socket in a second axis and a third axis, the second and third axes being disposed orthogonal to one another and orthogonal to the first axis.

62. The method of claim 61 further including the step of slidably joining a first connector member and the fuel injector for providing the translatability in the first longitudinal axis.

63. The method of claim 62 further including the step of rotatably joining a ball connector member to a socket connector member for providing the shiftability in the second and third axes.

64. The method of claim 63 further including the step of fluidly sealingly joining the connector to the certain fuel injector by means of a gland type coupling.

65. The method of claim 64 further including the step of fluidly sealingly joining the connector to the certain fuel injector by means of a gland type coupling having a capped nut in engagement with a ring seal.

66. The method of claim 65 further including the step forming the ring seal with a D-shaped cross section.

67. The method of 65 further including the step forming the capped nut with a chamfered face accommodating shifting of the connector relative to the fuel injector.

* * * * *